United States Patent

[11] 3,609,460

[72] Inventors Joel Ollendorf Springfield; Frederick P. Jones, Flemington, both of N.J.

[21] Appl. No. 740,905
[22] Filed June 28, 1968
[45] Patented Sept. 28, 1971
[73] Assignee RCA Corporation

[54] POWER TRANSISTOR HAVING BALLASTED EMITTER FINGERS INTERDIGITATED WITH BASE FINGERS
5 Claims, 1 Drawing Fig.

[52] U.S. Cl. .......... 317/234 R, 317/235 R, 317/235 W, 317/235 Y, 317/235 Z
[51] Int. Cl. .......... H01l 3/00, H01l 5/00
[50] Field of Search .......... 317/234, 235, 5.4, 40, 40.1, 40.12, 44

[56] References Cited

UNITED STATES PATENTS

| | | | |
|---|---|---|---|
| 3,449,648 | 6/1969 | Beale et al. | 317/235 |
| 3,475,665 | 10/1969 | McIver et al. | 317/235 |
| 2,816,847 | 12/1957 | Shockley | 317/235 |
| 3,225,261 | 12/1965 | Wolf | 317/235 |
| 3,309,585 | 3/1967 | Forrest | 317/235 |
| 3,319,139 | 5/1967 | Ruffler | 317/235 |
| 3,358,197 | 12/1967 | Scarlett | 317/235 |
| 3,368,123 | 2/1968 | Rittmann | 317/235 |
| 3,427,511 | 2/1969 | Rosenzweig | 317/235 |
| 3,449,682 | 6/1969 | Miwa et al. | 317/235 |
| 3,465,214 | 9/1969 | Donald | 317/235 |

FOREIGN PATENTS

| | | | |
|---|---|---|---|
| 6,515,148 | 5/1966 | Netherlands | 317/235 |

*Primary Examiner*—John W. Huckert
*Assistant Examiner*—Andrew J. James
*Attorney*—Glenn H. Bruestle

ABSTRACT: A transistor with interdigitated emitter and base fingers in which the emitter has a web portion for feeding current to the fingers, metal layers on both web and fingers, the finger portion metal layers being spaced from the web portion metal layer to introduce ballasting resistance, and the ends of the base fingers being spaced from the web metallizing a considerably greater distance than the spacing between emitter finger metallizing and the emitter-base junction.

PATENTED SEP 28 1971 3,609,460
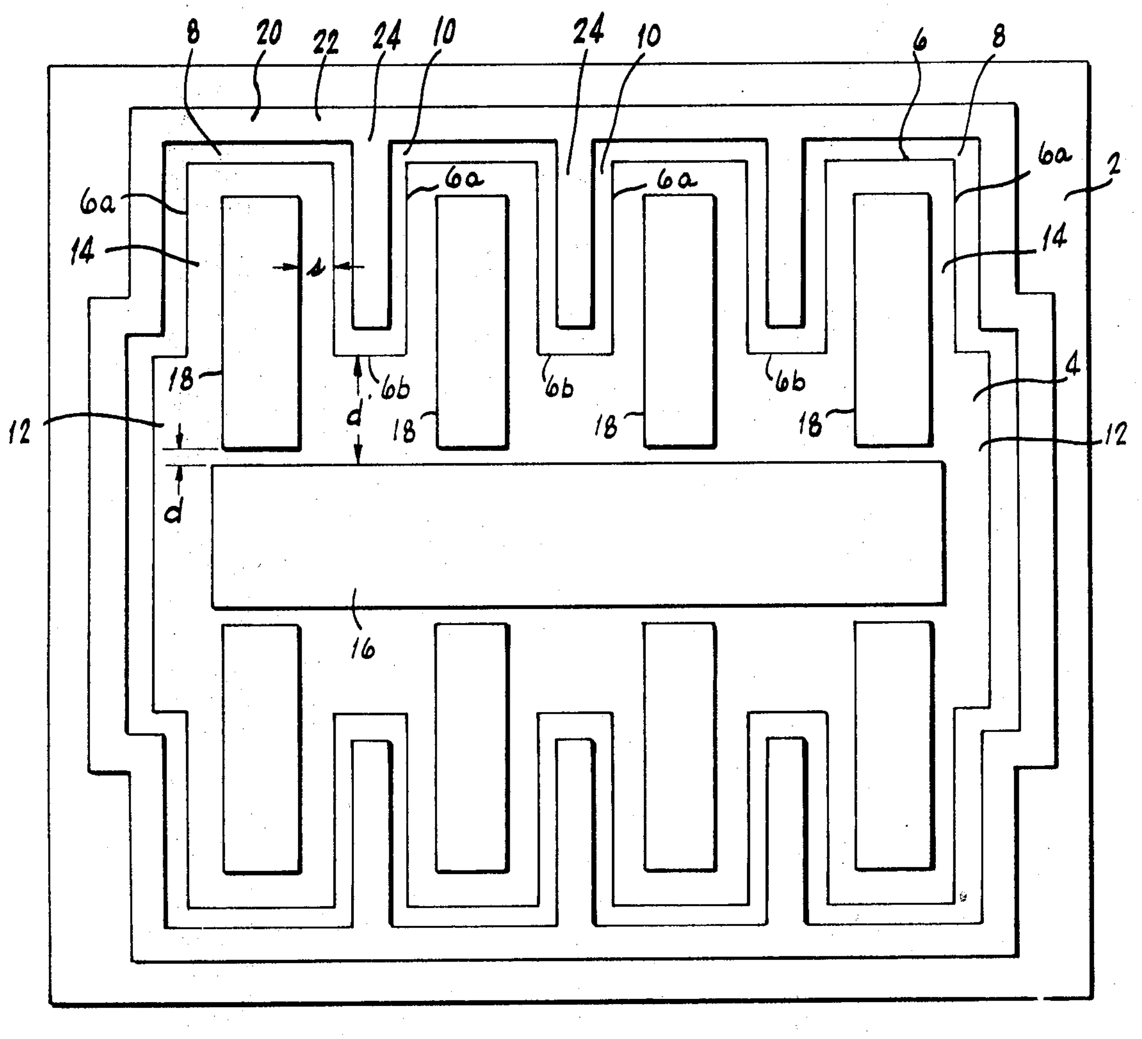
INVENTORS
JOEL OLLENDORF &
FREDERICK P. JONES
BY W. S. Hill
AGENT

POWER TRANSISTOR HAVING BALLASTED EMITTER FINGERS INTERDIGITATED WITH BASE FINGERS

BACKGROUND OF THE INVENTION

The present invention relates to transistors required to handle relatively large amounts of power. High-power transistors usually include an emitter region having a relatively large area so that the power is distributed over the device to keep the power per unit area within safe limits. It has previously been found that, in a power transistor having a relatively large area emitter, emitter-base injection occurs mainly around the periphery of the emitter. It has therefore become the practice to define the emitter region so that it has as large a periphery as possible in relation to area.

A number of different configurations have been adopted to secure relatively large emitter periphery. One of these is star-shape or similar shapes which include a plurality of convolutions extending radially outwardly from a hub portion. Another is a multiplicity of separate emitter sites all connected in parallel to function as a single emitter. Still another configuration is one in which the base region and the emitter region are of generally comb shape with a web portion and interdigitated fingers. The emitter may be a double comb with the web portions back to back.

The use of such configurations as described above has greatly improved emitter injection efficiency. Nevertheless, it has been found that, because of various triggering mechanisms, at present difficult to avoid, second breakdown occurs across the emitter-base junction because current is focused in one or more small spots. The focusing of current in small spots has previously been decreased by inserting ballasting resistors in series with the emitter in order to limit the maximum current that can flow between the emitter and base. In general, this expedient has been highly successful in reducing the difficulty. But it has proved to be more difficult to apply to some emitter configurations than to others.

It has also previously been proposed to utilize emitter ballasting resistors in that type of emitter which has a generally comb shape with fingers extending out from a central web portion which serves as a current feed path. This has been accomplished by leaving a space between the metal layer which covers the web portion of the emitter and the metal layer covering each finger portion, since this forces current travelling to the fingers to travel a given distance through the more highly resistive semiconductor.

OBJECTS OF THE INVENTION

An object of the present invention is to provide an improved power transistor having comb-shaped emitter and base regions, where ballast resistors are included in each of the finger portions of the emitter.

A further object is to provide an improved power transistor having more uniform IR drop across all active parts of the emitter-base junction.

SUMMARY OF THE INVENTION

The present invention comprises a power transistor of the type which includes an emitter region having a web portion which serves as a central current feed and finger portions extending outwardly from the web portion. The web portion is partly covered with a layer of metal and each finger portion is also partly covered with a layer of metal, but the metal layers on the finger portions are separated by a given distance from the metal layer on the web portion to introduce a predetermined resistance into each finger portion. Interdigitated with the emitter finger portions are base finger portions and each base finger portion has an extremity, defined by the emitter-base junction, relatively close to the metal layer of the emitter web portion. The present invention comprises setting the distance of the extremities of the base finger portions from the emitter web portion substantially equal to the distance between the emitter finger metallizing and the adjacent emitter-base junction, plus the distance between the emitter web metallizing and the emitter finger metallizing times the fraction consisting of the emitter-base junction length around the periphery of one of the emitter fingers over the width of a single base finger extremity. Or, in other words:

$$d' \approx s + d(P_f/P_b)$$

where,

*d'*=*distance between emitter webb metallizing and emitter-base junction*

*s*=*distance between emitter finger metallizing and adjacent emitter-base junction*

*d*=*distance between emitter web metallizing and adjacent emitter finger metallizing*

$P_f$=length of periphery around one emitter finger $P_b$=width of one base finger extremity.

THE DRAWING

The single figure of the drawing is a plan view of the top surface of a transistor constructed in accordance with the present invention.

DESCRIPTION OF PREFERRED EMBODIMENT

A typical transistor constructed in accordance with the present invention may comprise a collector region (not shown) on top of which is a base region 2 separated from the collector region by a PN junction (not shown). The base region may either be an epitaxial layer grown on the collector region and of opposite conductivity type to the collector region, or it may be a pocket diffused into the collector region. The device also includes an emitter region 4 which may be formed by diffusing impurities into the base region so that the emitter region is of a conductivity type opposite to the base region. The device may either be of N-P-N or P-N-P configuration, but, using present diffusion techniques, it is more effective with a P-N-P configuration than with an N-P-N configuration.

Between the base and emitter regions there is a PN junction 6 defining the boundary between the two regions.

The base region, where it surrounds the emitter region, comprises a web portion 8 and a plurality of rectangular-shaped fingers 10 extending outwardly from web portion 8 and perpendicularly thereto.

The emitter region also comprises a web portion 12 and rectangular-shaped finger portions 14 which are interdigitated with the finger portions 10 of the base region. The PN junction 6 separating the base region 2 from the emitter region 4 includes portions **6*a* extending around the periphery of each emitter finger and other portions 6*b* defining the extremity of each base finger 10**.

The emitter web portion 12 is partly covered with a metal layer 16 which provides a low resistance feedthrough for current entering the emitter region. Similarly, each emitter finger 14 is partially covered with a metal layer 18 which does not quite touch the PN junction portions **6*a*. The metal layer 18 is spaced from the adjacent junction 6*a*** by a distance *s*. This introduces a certain resistance between the emitter finger metallizing and the junction. The metallized finger layers 18 are separated from the metallized emitter web portion 16 by a distance *d*. Thus, a definite resistance value is introduced in the current path between the emitter web portion metal layer 16 and the finger metal layers 18, the magnitude of which depends upon the distance of separation between the metal layers and the sheet resistance of the emitter region of the semiconductor body.

As pointed out previously, it has been proposed to introduce a resistor in each finger portion of this type of device in order to limit the amount of current that can flow into each emitter finger. But this did not improve the second breakdown problem because previously, the PN junction portions **6*b* at the extremities of the base region fingers 10 had been placed relatively too close to the emitter web portion 16. In accordance with the present invention, it has now been found that the distance $d'$ between emitter web metal layer 16 and the PN junction portion 6b** should be greater than the distance $s$ in order to keep the IR drop uniform at all points along the emitter-base junction. In fact, as pointed out above, it has now been found that $d'$ should be about equal to $s+d(P_f)/(P_b)$. This configuration improves reliability of device operation and improves second breakdown resistance of the device. In a typical device the distance $s$ may be 2 mils, $d$ may be 1 mil, $P_f$ may be 50 mils, and $P_b$ may be 8 mils. This causes the distance $d'$ to be about 8 mils.

The device further includes a base region metallized layer 20 having a web portion 22 and finger portions 24.

Transistors constructed as described above have shown much improved resistance to second breakdown. They can be operated safely at considerably higher voltages than previously known transistors of this same general type.

Although, in the embodiment described, the shape of the emitter and base fingers is rectangular, the corners of the emitter and base fingers may be chamfered or rounded and the corners of the metal layers on the emitter and base fingers may also be shaped in this manner. In this case the width of the base finger extremity is taken as the maximum width where the fingers are not rounded or chamfered.

We claim:

1. A transistor of the type including emitter, base and collector regions of alternate conductivity types and having P-N junctions between emitter and base regions and between base and collector regions, wherein a. said emitter region comprises a central web portion and finger portions extending outwardly from the web portion, b. a metal contact layer covering part of said emitter web portion, c. a metal contact layer covering part of each said emitter finger portion but separated from said emitter web contact layer a predetermined distance whereby a first series resistance of predetermined provided in each said emitter finger portion, d. said metal contact layer on each said emitter finger portion also being spaced from said emitter-base junction, thus providing a second resistance in each said emitter finger portion, e. said base region including base finger portions interdigitated with said emitter finger portions and having extremities separated by a certain distance from said metal contact layer on said emitter web portion, f. said last-mentioned distance being substantially equal to the distance between said emitter finger metal layer and the adjacent emitter-base junction, plus the distance between said emitter web metal layer and said emitter finger metal layer times the fraction consisting of the emitter-base junction length around the periphery of one of said emitter fingers over the width of one of said base finger extremities.

2. A transistor according to claim 1 in which the configuration is P-N-P.

3. A transistor according to claim 1 in which said emitter fingers and base fingers are rectangular in shape.

4. A transistor according to claim 1 in which said base region comprises a web portion and finger portions extending perpendicularly thereto.

5. A transistor of the type including emitter, base and collector regions of alternate conductivity types and having P-N junctions between emitter and base regions and between base and collector regions, wherein a. said emitter region comprises a central web portion and finger portions extending outwardly from the web portion, b. a metal contact layer covering part of said emitter web portion, c. a metal contact layer covering part of each of said emitter finger portion but separated from said emitter web contact layer a predetermined distance whereby a first series resistance of predetermined amount is provided in each said emitter finger portion, d. said metal contact layer on each said emitter finger portion also being spaced from said emitter-base junction, thus providing a second resistance in each said emitter finger portion, e. said base region including base finger portions interdigitated with said emitter finger portions and having extremities separated by a certain distance from said metal contact layer on said emitter web portion, f. the distance between the emitter web portion metal layer and the closest portion of the emitter-base junction being about 8 times the distance between the emitter web portion metal layer and an emitter finger portion metal layer.

UNITED STATES PATENT OFFICE

CERTIFICATE OF CORRECTION

Patent No. 3,609,460 Dated September 28, 1971

Inventor(s) Joel Ollendorf & Frederick P. Jones

It is certified that error appears in the above-identified patent and that said Letters Patent are hereby corrected as shown below:

column 3, line 37, claim 1, section c, after "predetermined" insert -- amount is --.

Signed and sealed this 7th day of March 1972.

(SEAL)
Attest:

EDWARD M.FLETCHER,JR.
Attesting Officer

ROBERT GOTTSCHALK
Commissioner of Patents